United States Patent

[11] 3,554,312

[72] Inventors Fred P. Niedermeier;
 Irwin L. Joslin; Edward G. Orth, Peoria, Ill.
[21] Appl. No. 665,147
[22] Filed Sept. 1, 1967
[45] Patented Jan. 12, 1970
[73] Assignee Westinghouse Air Brake Company
 Peoria, Ill.
 a corporation of Pennsylvania

[54] VEHICLE STEERING SYSTEM
 8 Claims, 5 Drawing Figs.
[52] U.S. Cl. .................................................. 180/79.2
[51] Int. Cl. .................................................. B62d 5/06
[50] Field of Search .......................................... 180/79.2,
 79.2(B); 60/52(S)

[56] References Cited
 UNITED STATES PATENTS
2,973,658  3/1961  Bishop .......................... 180/79.2X
3,312,301  4/1967  Hagen ........................... 180/79.2(B)
3,370,422  2/1968  Carlson et al. ................. 180/79.2X Primary Examiner—Leo Friaglia
Assistant Examiner—John A. Pekar
Attorney—John F. Schmidt ABSTRACT: A steering system for an articulated vehicle of the off-highway type including tractor and trailer units pivotally connected for wagonlike steering movement about a vertical axis by actuation of hydraulic cylinders connected between the units. To facilitate fine control of the steering system, a variable displacement pump is provided to motivate the hydraulic cylinders at an infinitely variable rate. Additionally, cam means are positioned between a manually operable steering control and the pump whereby movement of the steering control means through one increment of movement results in an increased displacement and output of the pump, and increased rate of steering change relative to other similar increments of movement.

VEHICLE STEERING SYSTEM

FIELD OF INVENTION

This invention relates to vehicles of the articulated type, and, more particularly, to steering systems therefor.

DESCRIPTION OF THE PRIOR ART

In recent years, articulated vehicles, such as two-wheel tractor and two-wheel trailer units, have gained favor in off-highway applications. One of the reasons for this acceptance is that the weight distribution of such vehicles enhances traction by placing a relatively greater portion of the overall load on the tractor drive wheels as compared to a four-wheel tractor and four-wheel trailer arrangement. To steer such articulated vehicles, it is generally necessary to rotate the entire tractor relative to the trailer unit about a vertical axis, as is sometimes termed "wagon steer." Since such tractors alone may weigh as much as 40,000 pounds, neglecting the weight distribution of the payload thereon, substantial force must be generated to effect this steering movement. For this reason, steering systems for such articulated vehicles frequently include a plurality of large, heavy duty hydraulic cylinders connected between the tractor and trailer units, the cylinders being adapted to be extended and retracted by a relatively large capacity, constantly driven, tractor mounted hydraulic pump connected to the cylinders by large diameter flexible lines.

Such heavy duty steering systems, while often quite reliable, have not always been sufficiently responsive or finely controlable for effecting both major and minor steering corrections throughout a full range of operating speeds and diverse conditions. This problem is particularly emphasized in an off-highway or earthmoving vehicle environment wherein steering systems must be of a large capacity but flexible enough to provide the required steering characteristics when the tractor is operating under great loads at extremely low speeds, as well as when the tractor is operating at approximately highway speeds. For example, for loading an earthmoving scraper of the articulated type in a cut at speeds of one or two miles per hour, a large steering pump output may be desired to achieve major steering corrections at such low speeds. However, at high hauling speeds, a small steering pump output may be desirable or necessary for minor steering corrections or "feathering" without possibly hazardous overcorrection.

Heretofore, heavy duty steering systems for articulated vehicles have been available wherein one or two constantly driven pumps are provided, the latter type including a large output pump and a small output pump. Either output may be selectively directed to the steering cylinders depending upon the rate of steering correction desired. Such one or two output level systems have often been found unsatisfactory because they are insufficiently responsive under a full range of operating conditions, are not sufficiently adjustable as to rate of steering correction, are structurally complicated, incur large hydraulic lines losses through constant output and induce consequential unnecessary parasitic drain of the tractor engine horsepower. Still further, such systems are often of the followup or automotive-type necessitating constant movement of the steering wheel to effect a continuous steering correction. If the steering wheel of such systems is held stationary at any point, no further steering correction is made. Further, steering systems of the automotive-type, which incorporate a pair of pumps sometimes require that one force be exerted on the steering wheel to operate the small capacity pump, while a greater force must be exerted to operate the large capacity pump. This requirement for various force applications by a tractor operator sometimes makes it difficult for an operator to accurately control his vehicle in a rough off-highway application.

SUMMARY OF THE INVENTION

It is a general object of the present invention to provide a steering system for an articulated vehicle of the off-highway type which circumvents or minimizes the problems heretofore noted.

In achieving this general object, the present invention provides a steering system for an articulated vehicle of the off-highway type, the vehicle including tractor and trailer units pivotally connected for steering movement about a vertical axis by actuation of fluid cylinder means connected between the units, and an intermittent and variable output fluid pump means for supplying fluid under pressure to the fluid cylinder means to effect steering movement.

The vehicle may further include a manually controlled, steering means and means connecting said steering means to said pump means whereby each equal increment of increased movement of said steering means increases the output of said pump means relative to preceding increments.

BRIEF DESCRIPTION OF THE DRAWINGS

In describing the invention reference will be made to the accompanying drawings in which.

DESCRIPTION OF A PREFERRED EMBODIMENT

Figure 1:
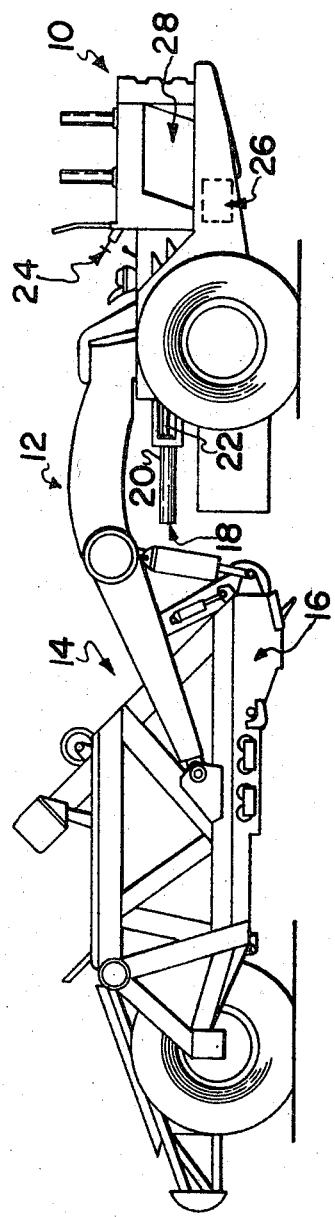
FIG. 1 is a side elevational view of an articulated vehicle of the earthmoving scraper type incorporating a steering system according to the present invention.
Figure 5:
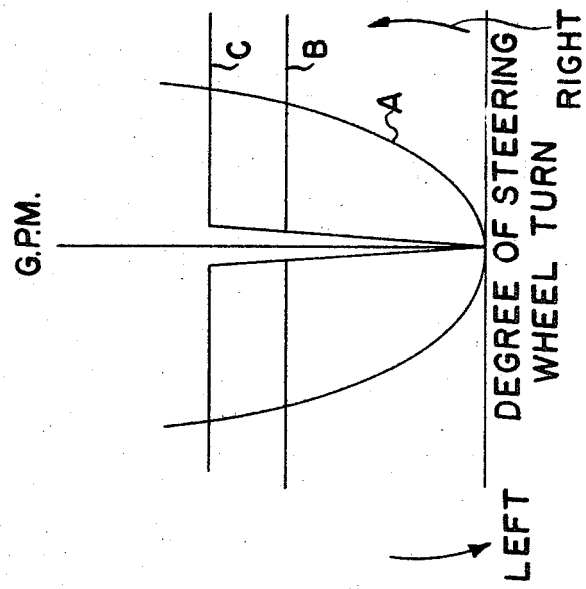
FIG. 5 is a graph of certain steering characteristics of a steering system according to the present invention compared to prior art characteristics.

Referring in more detail to FIG. 1 of the drawings, a generally conventional articulated vehicle of the earthmoving scraper type is shown therein. The vehicle comprises a two-wheel tractor unit 10, pivotally connected for steering movement about a vertical axis to a gooseneck and draft frame assembly 12 of a two-wheel scraper unit 14. The scraper unit 14 includes a scraper bowl 16 connected to the rear end of the gooseneck and draft frame assembly 12, the bowl being adapted for elevational adjustment by actuation of a pair of double-acting, hydraulic hoist cylinders, connected between the forward end of the bowl 16 and the draft frame assembly 12.

To effect steering movement between the tractor and trailer units, a pair of double-acting, hydraulic steering cylinder assemblies 18 are provided. A forward portion of each cylinder 20 of the assemblies 18 may be connected to the scraper unit and the forward end of each rod 22 may be connected to the tractor unit. This hydraulic cylinder arrangement is of a conventional type and is identical to that shown in applicants' assignee's U.S. Pat. No. 3,338,329 to Orth.

For controlling actuation of the steering cylinders 18, a manually controlled, steering wheel 24 is mounted adjacent the operator's compartment. The steering wheel is adapted to be rotated in either lateral direction to direct the output of a hydraulic steering pump 26 to appropriate sides of the steering cylinder assemblies 18.

Figure 2:
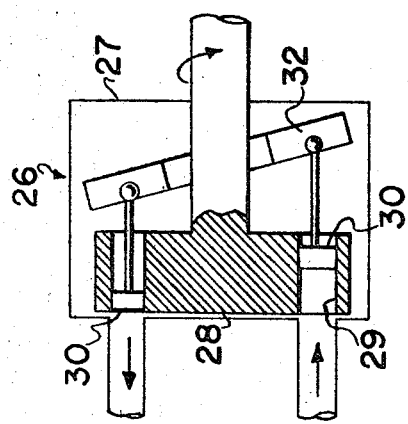
FIG. 2 is a schematic illustration of a hydraulic pump utilized in a steering system for use with the articulated vehicle shown in FIG. 1.

Of particular significance is the aspect of the present invention wherein the pump 26 is of an intermittent output and variable displacement, wobble plate type, such as manufactured by the Vickers Company, Part No. M-PUB 29 -LDE -10 -DA-0 -088, heretofore utilized in other environments as disclosed in U.S. Pat. to Keel, No. 2,870,746. Such a variable displacement pump, as schematically illustrated in FIG. 2, is adapted to be constantly driven and includes a housing 27, in which is rotatably mounted a barrel 28. The barrel includes a plurality of cylinders 29, each cylinder slidably receiving a piston 30, the exposed end of which is connected to a rotatable wobble or swash plate 32. The wobble plate 32 is movable from a straight or neutral position wherein there is no pump output to a position inclined to either side. Depending upon the direction and magnitude are determined. In this regard, the pump mechanism per se also serves as a valve to direct fluid to either steering cylinder 18. Because of its construction and connection with the steering wheel 24, the pump 26 produces no substantial output when the wobble plate 32 is in the neutral or straight position, as would be the case when the steering wheel 24 is in the centered or neutral position. In this manner, line loss as would be provoked by a constant output pump heretofore utilized in heavy duty steering applications, are circumvented and unnecessary parasitic losses of tractor engine horsepower are minimized. Additionally, utilization of a variable displacement pump in the present steering system provides an infinitely variable steering correction rate, as opposed to the one or two rates of the steering systems of the prior art.

Figure 3:
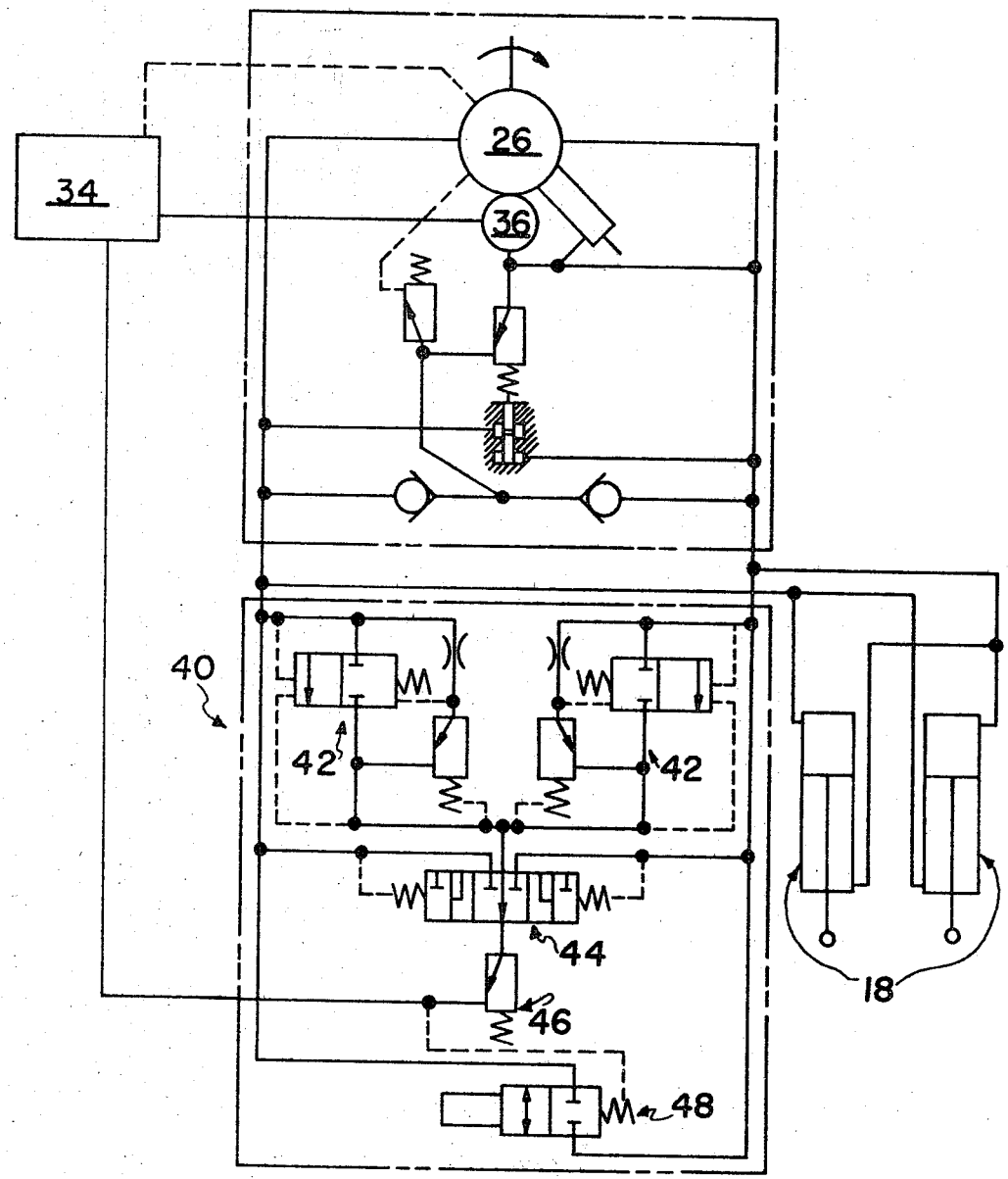
FIG. 3 is a schematic diagram of a hydraulic circuit for the steering system for effecting steering movement of the articulated vehicle shown in FIG. 1.

A hydraulic circuit which may be utilized in conjunction with the present invention, but the details of which are not critical thereto, is diagrammatically illustrated in FIG. 3. As is shown therein, the variable displacement pump 26, which may have an output of approximately 30 g.p.m., is placed in fluid communication with a hydraulic reservoir 34 and the steering cylinders 18 by appropriate conduits. A control pump 36 of a small output, such as a few g.p.m., is positioned to direct cooling fluid directly from the reservoir to the variable displacement pump 26 in the right turn, left turn, and relief conditions of the steering systems. Additionally, the control pump serves a "makeup function" necessitated by the geometry of the connection between the cylinder assemblies 18 and the tractor and trailer units, which results, during certain phases of steering, in a condition wherein the pistons of the steering cylinders may move a different amount. In this condition, an insufficient amount of fluid may be returned to the pump necessitating a makeup function by the control pump 36 which is intended to provide an excess of fluid flow to the variable displacement pump 26.

A generally conventional shuttle relief valve assembly 40 such as that manufactured by the Vickers Company, Catalog No. SP-258, is in fluid communication with the pump circuit and includes a pair of high pressure relief valves 42, a shuttle spool 44, and a back pressure valve 46, the collective function of which is to provide a circuit for insuring cooling flow from the control pump 36 to the variable displacement pump 26 in the operational conditions mentioned above, as well as overload relief and an appropriate circuit for return of fluid flow to the reservoir 34. Additionally, the shuttle relief valve assembly 40 includes a tow valve 48 which may be manually actuated to interconnect the circuits between the steering cylinder assemblies 18 when necessary as for towing and the like, without operation of the tractor engine.

To connect the steering wheel 24 to the wobble plate 32 of the variable displacement pump 26 whereby the wobble plate will be moved from a straight or neutral position through a greater arc by each successive, equal increment of movement of the steering wheel away from neural, a steering cam system 50, schematically illustrated in FIG. 3, is provided. A steering column 52 is mechanically connected to the steering wheel 24 and on the lower end of the steering column, a cam plate 54 is provided. A spring loaded cam follower 56 is mechanically or hydraulically connected, by any suitable means, to the variable displacement pump wobble plate and cooperates with the cam plate 54, whereby rotation of the steering wheel changes wobble plate inclination and pump output. But still further, because a cam surface is provided, the rate of change of wobble plate inclination and pump output is increased for each increment of movement of the steering wheel away from neutral. Utilization of a cam system in the connection between the steering wheel and the pump wobble plate is particularly advantageous because it permits steering characteristics to be conveniently tailored to suit a wide variation of conditions.

For example, the cam plate 54 may be designed so that after achieving a 90° steering correction in either direction, pump output is cut off thereby making unnecessary any provision of relief valves in the steering cylinders which dump upon bottoming of the pistons in the cylinders, as on 90° turn.

Also of particular significance is the aspect of the present invention wherein the variable displacement pump, generally speaking, has no output in a neutral condition. However, it should be noted that, in practice, some minor output may be present because of wobble plate or system "centering" difficulties or leakage. Such output might tend to induce steering creep in light vehicles. However, applicants have found that because the present invention is used for steering heavy, articulated off-highway type vehicles, the weight of such vehicles and force required to turn the same is such that steering creep induced by such minor output is not problematical.

Figure 4:
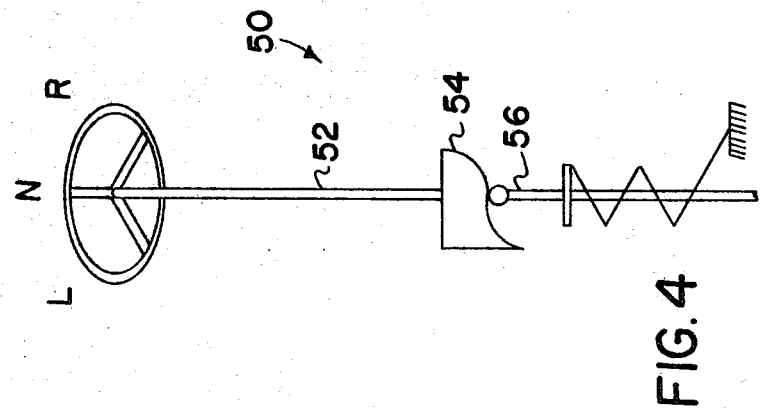
FIG. 4 is a schematic view of a steering control means for actuating a steering system according to the present invention.

But still further, as diagrammatically depicted in FIG. 4, curve A, the output of applicants' pump is infinitely variable up to its maximum capacity at the convenient selection of the tractor operator by merely turning the steering wheel to any position depending upon the desired rate of steering correction. Continued steering correction at that rate will be made without further movement. If a different rate is desired, it is merely necessary to alter steering wheel position. Such is not the case in the prior art embodiments including single or double pumps, the output of which is diagrammatically indicated by curves B and C in FIG. 4. In such systems, output is at merely one or two levels unless other parameters are adjusted. In this light, it will be seen the present invention provides a steering system wherein steering rate of correction may be finely controlled thereby providing proper system responsiveness at any vehicle speed or operating condition.

In describing the present invention, although reference has been made to but a single embodiment, it should be appreciated by one skilled in the art that various additions, deletions and modifications may be made which fall into the scope of the present invention.

We claim:

1. In a steering system for an articulated vehicle of the off-highway type including tractor and trailer units pivotally connected for steering movement about a vertical axis by actuation of fluid motor means connected between the units, the improvement comprising variable displacement pump means for directing fluid under pressure to said fluid motor means.

2. In a steering system according to claim 1, said system further including manually operable steering control means movable from a neutral position, and connecting means connecting said steering control mean to said pump means so that maintenance of said steering control means in any stationary operating position remote from the neutral position results in movement of said fluid motor means.

3. In a steering system according to claim 1, said system further including manually operable steering control means, connecting means connecting said steering control means to said pump means so that movement of said steering control means through at least one increment of movement results in an increased displacement and output of said pump means relative to other equal increments of movement of said steering control means.

4. In a steering system according to claim 3 wherein said pump means includes movable wobble plate means operatively associated with a plurality of piston means, the inclination of said wobble plate means determining magnitude and direction of the output of the pump means, said connecting means including cam means operatively connected to said wobble plate means.

5. In a steering system according to claim 4, said fluid motor means comprising a plurality of hydraulic cylinder assemblies, each including rod means connected to one of said units slidably received in cylinder means connected to the other of said units whereby extension and retraction of said fluid motor means causes relative rotation of said unit about said vertical axis.

6. In a steering system according to claim 3, wherein said manually operable steering control means is movable from a neutral zone to steer the vehicle to the left and right and said connecting means includes cam means so that movement of said steering control means from the neutral position results in an increased rate of displacement of said pump means for each increment of movement away from said neutral zone.

7. In a steering system according to claim 6, wherein said cam means is designed to return said pump means to the neutral position after a 90° steering correction has been achieved.

8. In a steering system according to claim 3, wherein said system further includes control pump means having an output capacity substantially less than said variable displacement pump means and positioned to direct its output to said variable displacement pump means when said variable displacement pump means is in certain predetermined conditions.

UNITED STATES PATENT OFFICE
CERTIFICATE OF CORRECTION

Patent No. 3,554,312     Dated January 12, 1971

Inventor(s) Fred P. Niedermeier et al.

It is certified that error appears in the above-identified patent and that said Letters Patent are hereby corrected as shown below:

Column 3, line 5, after "magnitude" insert -- of wobble plate inclination, both pump output direction and magnitude --; line 60, "neural" should read -- neutral --.

Signed and sealed this 8th day of June 1971.

(SEAL)
Attest:

EDWARD M. FLETCHER, JR.          WILLIAM E. SCHUYLER, JR
Attesting Officer                 Commissioner of Patents